United States Patent [19]

Kuivamaki et al.

[11] Patent Number: 4,689,510
[45] Date of Patent: Aug. 25, 1987

[54] ELECTRIC MOTOR AND FLYWHEEL FOR OPERATION WHILE IMMERSED IN A LIQUID

[75] Inventors: Ismo Kuivamaki; Klaus Uuskoski, both of Hyvinkaa, Finland

[73] Assignee: Elevator GmbH, Baar, Switzerland

[21] Appl. No.: 867,674

[22] Filed: May 28, 1986

[30] Foreign Application Priority Data

Jun. 6, 1985 [FI] Finland .................................. 852268

[51] Int. Cl.⁴ .......................... H02K 7/02; F01D 1/36; F04F 1/18
[52] U.S. Cl. ...................................... 310/74; 310/87; 417/90
[58] Field of Search ....................... 310/87, 74, 62, 90; 417/90; 187/29 A, 29 B

[56] References Cited

U.S. PATENT DOCUMENTS

| 1,216,242 | 2/1917 | MacDonald | 310/87 |
| 2,282,243 | 5/1942 | Rambo et al. | 310/87 |
| 3,308,762 | 3/1967 | Fricker | 310/87 |
| 3,396,664 | 8/1968 | Smith | 415/90 |
| 4,403,911 | 9/1983 | Possell | 415/90 |

FOREIGN PATENT DOCUMENTS

| 1023257 | 1/1958 | Fed. Rep. of Germany | 310/74 |
| 52-46501 | 9/1975 | Japan | 415/90 |

Primary Examiner—Patrick R. Salce
Assistant Examiner—D. L. Rebsch
Attorney, Agent, or Firm—Bell & Arkin

[57] ABSTRACT

An electric motor, for instance for a hydraulic elevator, is entirely immersed within a liquid such as oil, and is provided with a flywheel. A drawback of this kind of electric motor is that the flywheel, rotating in oil, brakes the rotation of the motor. In the present electric motor the flywheel is enclosed in a housing and an air pipe extends to the housing so that by action of centrifugal force air is drawn into the housing, and liquid in the housing escapes from the housing through a discharge aperture when the motor starts.

2 Claims, 2 Drawing Figures

ELECTRIC MOTOR AND FLYWHEEL FOR OPERATION WHILE IMMERSED IN A LIQUID

FIELD OF THE INVENTION

The present invention relates to an electric motor, e.g. for hydraulic elevators, the motor being entirely immersed in a liquid, e.g. oil, and being provided with a flywheel.

BACKGROUND OF THE INVENTION

It has been found that a flywheel rotating in oil brakes quite substantially the rotation of an electric motor and therefore, consumes energy quite unnecessarily.

BRIEF SUMMARY OF THE INVENTION

It is accordingly an object of the present invention to eliminate or at least reduce this drawback and to provide an electric motor of a new type, primarily for hydraulic elevators.

The present invention provides an electric motor entirely immersed in a liquid and provided with a flywheel, the electric motor comprising a housing enclosing the flywheel, air inlet duct means communicating with the interior of the housing from the atmosphere for the inflow of air into the housing upon operation of the electric motor, and discharge aperture means in the housing for allowing liquid to escape from the housing through the discharge aperture means upon operation of the electric motor.

With the aid of the invention, the flywheel can be made to rotate in an air space despite the fact that the entire motor operates in oil. Since it is very difficult to make the housing absolutely oilproof for the entire service life of the motor, the housing has been provided with the air duct means, whereby the rotation of the flywheel empties the housing when the motor starts. Therefore, leakage of oil into the housing will not impair the performance of the motor.

It will thus be understood that the flywheel and the housing act as a kind of centrifugal pump. When the motor starts, the flywheel forces any oil that has run into the housing out through the discharge aperture means and the housing fills with air entering through the air duct means.

Since the flywheel rotates in air, the power required for rotation is considerably less than would be the case if it rotated in oil. Consequently, substantially more power is available from a motor of a given size, e.g. to rotate a pump. The flywheel and the motor also stop more slowly because no braking is caused by the oil, with the result that the stopping of the elevator will take place more smoothly.

Preferably, the housing comprises a circular end wall and the air inlet duct means extends to the center of the circular end wall, the discharge aperture means being provided at the periphery of the housing, and the electric motor further comprises outlet duct means communicating with the discharge aperture means for conducting the outflow of the liquid from the housing.

Both duct means communicating with the housing may extend into the atmosphere, so that the housing is not immediately filled with oil when the motor stops.

DESCRIPTION OF THE DRAWINGS

Further features, objects and advantages of the invention will appear from the following description thereof given with reference to the accompanying drawing, wherein.

DESCRIPTION OF THE PREFERRED EMBODIMENT

Figure 1:
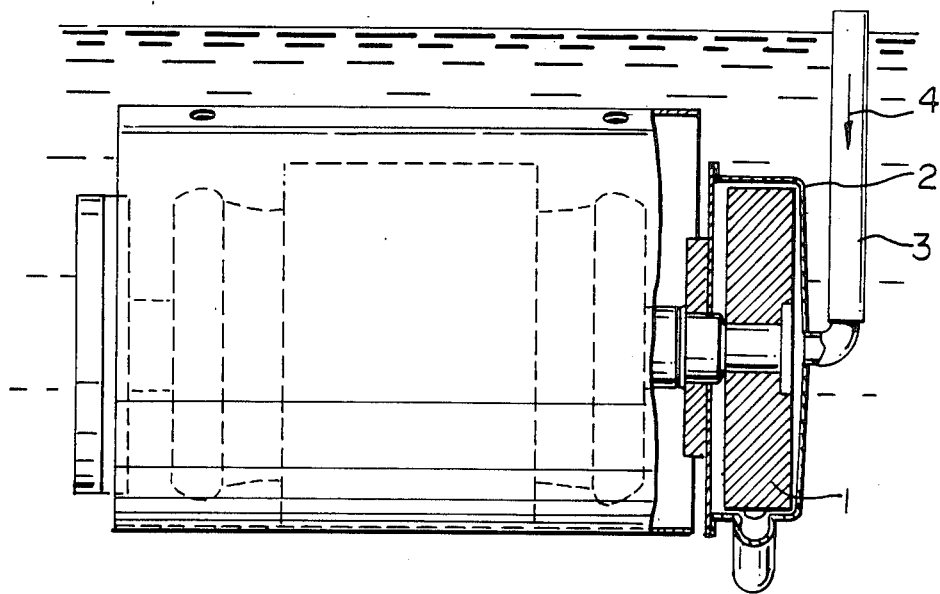
FIG. 1 shows a view in vertical longitudinal cross-section through an electric motor according to the invention.
Figure 2:
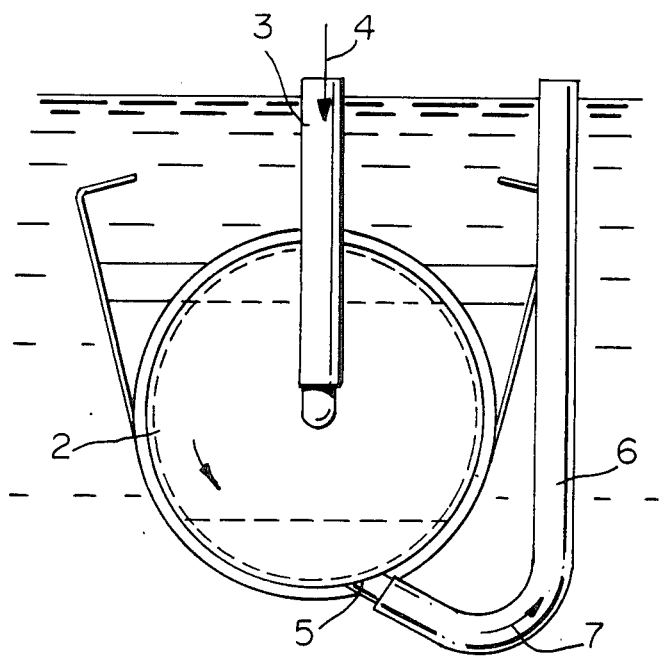
FIG. 2 shows an end view of the motor of FIG. 1.

The electric motor shown in the drawing is intended for use in hydraulic elevators and is entirely immersed in oil and provided with a flywheel 1. The flywheel is enclosed in a housing 2, and an air pipe 3 extends downwardly from the atmosphere through the oil and into the housing 2, so that air is drawn by centrifugal force in to the housing 2 as indicated by the arrow 4.

The liquid in the housing 2 escapes from the housing through a discharge tube 5 when the motor starts. The air pipe 3 extends to the center of an exterior housing flange, forming a circular end wall of the housing 2. A discharge aperture 5 is located at the periphery of the housing, and an outlet tube 6 extends from the discharge aperture 5 to above the surface of the oil.

When the motor starts, air is drawn into the housing in the manner shown by the arrow 4, and oil in the housing is discharged through the tube 6, as shown by the arrow 7, so that the flywheel 1 may rotate freely in an air space.

It will be apparent to a person skilled in the art that the invention is not restricted to the example presented in the foregoing and that it may instead vary within the scope of the claims presented below.

We claim:

1. An electric motor for immersion in a liquid and provided with a flywheel, said electric motor comprising:
   a housing enclosing said flywheel and containing an amount of said liquid;
   air inlet duct means communicating with the interior of said housing from the atmosphere for the inflow of air into said housing upon operation of said electic motor; and
   discharge aperture means in said housing for allowing said liquid to escape from said housing through said discharge aperture means upon operation of said electric motor.

2. The electric motor as claimed in claim 1, wherein said housing comprises a circular end wall and said air inlet duct means extends to the center of said circular end wall, said discharge aperture means being provided at the periphery of said housing, and wherein said electric motor further comprises outlet duct means communicating with said discharge aperture means for conducting the outflow of the liquid from said housing.

* * * * *